Figure 1:
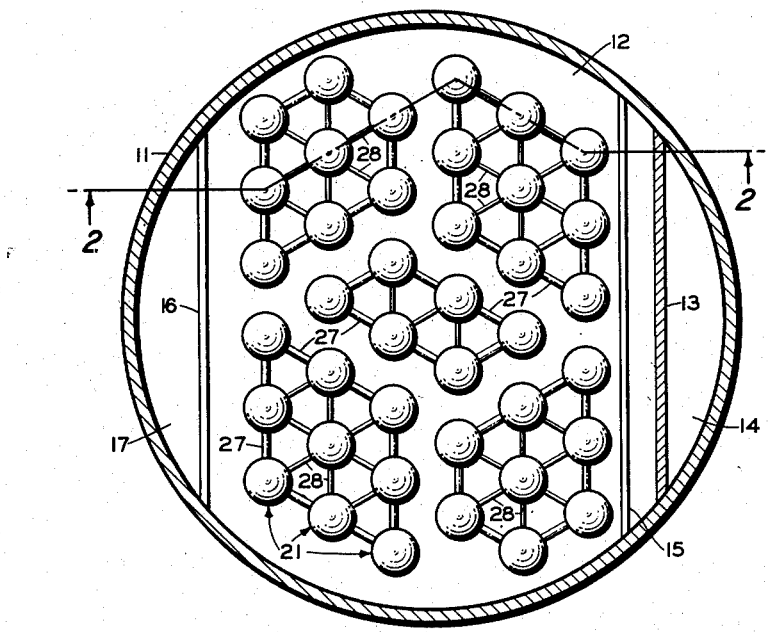

Feb. 3, 1953     H. V. HENDRIX     2,627,397

BUBBLE CAP ASSEMBLY FOR FRACTIONATING APPARATUS

Filed Aug. 8, 1949

INVENTOR.
H. V. HENDRIX
BY Hudson & Young
by H. E. Mensore

ATTORNEYS

Patented Feb. 3, 1953

2,627,397

UNITED STATES PATENT OFFICE 2,627,397

BUBBLE CAP ASSEMBLY FOR FRACTIONATING APPARATUS

Hurshel Victor Hendrix, Bartlesville, Okla., assignor to Phillips Petroleum Company, a corporation of Delaware Application August 8, 1949, Serial No. 109,171

3 Claims. (Cl. 261—114)

This invention relates to liquid-gas contacting apparatus. In one of its more specific aspects it relates to a liquid-gas contactor tray construction and placement of bubble caps. In a still more specific aspect it relates to a bubble cap-tray assembly designed to improve the distribution of the vapors rising through the tray.

My invention is particularly directed to bubble cap-tray type vapor-liquid contacting apparatus for use in any process in which it is desired to contact intimately a downward flowing liquid with an upward flowing gas or vapor. As a specific embodiment for exemplary proportions I will describe my invention as adapted to bubble cap tray apparatus for use in fractionating columns.

In bubble cap type fractionator columns are decks or trays, usually arranged hoizontally, and upon which are placed the bubble caps. The number of bubble caps on each tray is a function, among other things, of the arrangement of the trays, spacing pattern and distance from cap to cap. The trays are also provided with overflow pipes or down flow spouts to permit liquid to flow from one tray to the tray next below without permitting simultaneous upflow of vapor. The down spouts are usually staggered with respect to the trays so that liquid reaching one tray on one side of the column will flow across the tray and then pass downward through a down spout to the next tray below, and so on on the way down the fractionator. Such columns may have only a half dozen trays or even less if a feed stock requires only little fractionation, while other columns may have 100 or more trays for separation of close boiling components. Some fractionators have so many trays that it is necessary to divide the fractionator into two or more sections so that the equipment will not be too tall for structural reasons.

It has been known for a number of years that there is a considerable hydraulic gradient across each tray of a bubble tray column. As fractionating processes have become more refined so as to produce very close cut fractions or even pure hydrocarbons, or to fractionate large volumes of hydrocarbon mixtures, the diameter of the fractionating towers has been increased and the amount of liquid flowing down through such a column has been increased many fold in order to make the necessary separation. With increasing liquid downflow the hydraulic gradient across a tray has increased until it is not uncommon to encounter hydraulic gradients of 6 to 8 inches across a 12 foot diameter column. In most columns the bubble caps on a given tray are positioned at a uniform distance above the tray and thus with the excessive hydraulic gradient the slot submergence varies as the gradient. Since the upwardly flowing vapor takes the path of least resistance a disproportionately large amount of vapor will pass through those bubble caps located near the overflow weir over which the liquid flows on its way to the next tray below. This condition frequently is so severe that the tray "dumps," that is, liquid passes downward through the bubble caps on one side of the tray and all the vapor passes up through the caps on the other side of the tray with the result that separation or fractionation efficiency is greatly reduced.

Many means have been proposed for overcoming the effect of a hydraulic gradient on a bubble cap tray. One method was to construct a tray in the form of a number of small sections so arranged that in flowing a short distance the liquid would flow over a weir onto the next and lower section and after flowing across this section the liquid would likewise flow over a weir and drop onto still another section. A tray could be constructed in as many sections as desired. Such construction, however, is relatively costly and has not been widely adopted. Another method suggested in an attempt to solve this gradient problem is to use chimneys of different heights on a horizontal tray. The tallest or highest chimneys are used on the section of the tray on which the depth of liquid is the greatest and of course that point is adjacent the point of entrance of liquid to a tray. The shortest chimneys would be used at points nearest the overflow weir. Still another attempt to solve this common problem involved the use of chimneys of the same or different heights and bubble caps, the vertical positioning of which is adjustable. All these various methods and many others have as their common object the maintenance of uniform slot submergence across the trays so as to maintain uniform vapor flow through the bubble caps on the tray. All of these methods have the same shortcomings, that is, when the tray with its chimneys and caps is designed to contact upflowing vapors with a given volume of downflowing liquid upon change in the volume of downflowing liquid the gradient is changed and accordingly, the vapor flow through the caps becomes unbalanced. While it has been found that some improvement can be obtained by these various means, it is generally concluded that they are merely small improvements and fall far short of fully solving the problem.

I have devised a bubble cap tray assembly which is intended to solve the above-discussed gradient problem. In designing my tray, I use chimneys of equal height or I may vary the chimneys somewhat in height, the taller ones, of course, being positioned at points nearest the liquid inlet point to a tray while the shortest chimneys are positioned at points nearest the overflow weir. All chimneys then in between these two extremes are arranged to decrease gradually in height from the liquid inlet point to the weir. Disposed over the upper ends of these chimneys are more or less conventional bubble caps. I do not bolt or rigidly attach a bubble cap to the tray or to the chimney at its intended position but I affix together a number of bubble caps covering adjacent chimneys in the form of a raft, and further, I construct my bubble caps of a metal or other material sufficiently light in weight that the raft assembly can float on the liquid at its desired position on the tray. Several chimneys of each group of chimneys are equipped with an outer rim or flange at their upper ends. The bubble caps, which are to ride over these particular chimneys, are equipped with some guides or brackets, so that these caps cannot rise off the upper ends of the chimneys and float away. I prefer to provide at least three chimneys in each group with these flanges since three points define a plane. All chimneys, however, may be constructed with flanges. By this arrangement the groups or rafts of caps nearest the point of greatest depth of liquid on a tray are intended to float higher above the level of the tray than the rafts of caps at points nearer the overflow weir.

One object of my invention is to provide an improved bubble cap tray assembly for use in liquid-gas countercurrent contacting apparatus. Another object of my invention is to provide an improved bubble cap tray assembly for use in fractionating columns. Still another object of my invention is to provide a bubble cap assembly which will permit uniform passage of vapors over the entire area of a tray. Yet another object of my invention is to provide a bubble cap tray assembly wherein irregularities of gas flow caused by varying hydraulic gradient are compensated for. Still other objects and advantages will be realized by those skilled in the art upon reading the following disclosure and drawing which respectively describes and illustrates a preferred embodiment of my invention.

Figure 2:
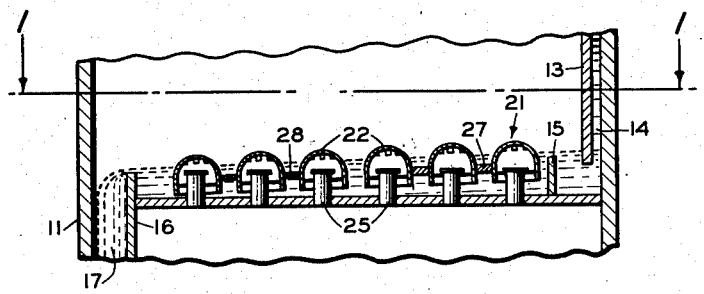
Figure 3:
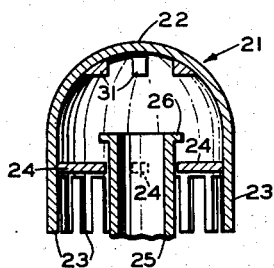

In the drawing, Figure 1 represents diagrammatically a horizontal sectional view of my bubble cap tray vapor-liquid contacting assembly taken on the line 1—1 of Figure 2. Figure 2 is a sectional view of the cap-tray assembly taken on the line 2—2 of Figure 1. Figure 3 is a sectional view on an enlarged scale of a bubble cap in position with respect to its chimney.

Referring now to the drawing, reference numeral 11 refers to the circular walls of a distillation column or of any vapor liquid contacting column. The column is fitted with a desired number of the horizontally disposed trays 12. In one side of the column is a vertically disposed plate 13 forming a space 14 between the plate and the periphery of the vessel 11 through which liquid from a tray above flows to the plate shown in the drawing. In order to provide a liquid seal for downcomer 14, thus preventing passage of vapor through the downcomer, plate 15 is provided as a dam over which the liquid must flow. Disposed in a more or less regular pattern is a number of chimneys 25. These chimneys are merely tubes open at both ends and the lower ends of which are fitted into holes in the tray 12. Through the chimneys vapors from the space below tray 12 pass and are delivered to points under the bubble caps. A plate 16 at the opposite side of tray 12 extends a short distance above the level of the tray to form a weir or dam for maintaining a given minimum depth of liquid at that point on the tray. Between the plate 16 and the periphery of the column 11 at that point is a space 17 through which the liquid flows from the tray 12 to the next lower tray. This plate 16 extends downward to a short distance above the next lower tray in the same manner as plate 13 is extended to a point rather close to tray 12. These plates 16 and 13 must extend to a point below the surface of the liquid on the tray so that vapor from the space above tray 12 cannot flow upward through the space 14. The construction and positioning of these plates 13 and 16 are well known in the art.

On reference to Figure 3, the chimney 25 is equipped at its upper end with an outside flange or rim 26 as mentioned hereinabove. The bubble cap dome may be, for example, a half sphere and at a point near the bottom of this half sphere are some brackets or guides 24. These guides are merely prongs which extend inward from the circumference of the dome 22 and the effective diameter of the distance between adjacent ends of opposite prongs 24 is smaller than the largest diameter of the flange 26 and is larger than the outer diameter of the chimneys 25 so that the bubble cap may be easily raised and lowered with respect to the chimneys, but limit of the raising of the bubble cap is defined by the flange 26 since the bubble cap may be raised until the prongs 24 are stopped at the underside of the flange 26. In the top of the bubble cap dome 22 are several stops 31 which are intended to rest upon the upper surface of the flange 26 when the bubble cap is at its lowest position with respect to the chimney 25. These stops 31 are separated from one another since at times when the bubble cap is at its lowest position space is provided for the flow of vapor from the chimney and such space is provided between the stops 31. In most cases, stops 31 are preferred so as to insure relatively uniform distribution of vapor through all of the caps of a given tray when the total volume of vapor passing upwardly through a column is a relatively small percentage of the designed capacity of the column. In addition, these stops tend to make certain that some vapor can pass into the vapor dome of each and every cap when operations are first started. There might be, however, some special cases in which it is desirable to have the top of a cap form a seal against the top of the chimney when no vapor is flowing in the column. Thus, while the use of the stops 31 represent a preferred embodiment, they are not an essential feature. The lower or bottom edge of the bubble cap is perforated, serrated, or slotted so as to provide a plurality of passages for the vapor.

As illustrated in Figures 1 and 2 the rafts or floats of bubble caps may vary in size with respect to the number of bubble caps. In the raft in the center of Figure 1 are disposed 6 caps, while in two of the remaining rafts are 8 caps, and in the other two are 9. Under some circumstances it might be desirable to construct these floats of for example 3 or 4 or any desired number of caps. As illustrated, the caps are attached to one another by means of bars 27 and rods 28. These rods and bars may preferably be welded or may even be bolted to the caps or attached thereto in any desired manner. The main point of consideration is that the several caps should be rigidly assembled to form a raft or float so that during continued operation of the apparatus, caps will not become separated from the rafts.

It is not necessary that all of the chimneys be provided with the flanges 26 since caps covering the flanged chimney carry the guides 24, and the fewer of the caps which are equipped with the guide members the lighter the weight of the cap assembly. Cap assemblies should contain, preferably, 3 caps with guide prongs 24 disposed so as to define a plane. Rafts may contain more or less caps than three. A sufficiently large number of caps of each float should be provided with guides 24 and flanged chimneys so as to provide a stable and easily floatable raft.

It is preferable to make the floats relatively small, that is, containing, for example, from 6 to 8 or 9 bubble caps. If a raft is made to include all of the caps of a fractionator tray, at least a portion of the advantage of my invention might not be realized since hydraulic gradient across a tray is not necessarily uniform. Thus to take full advantage of my invention under nonuniform gradient across the tray, it is preferred to construct the rafts of a relatively small number of bubble caps so that each raft may adjust itself to the height of the liquid in its immediate vicinity.

It will be obvious that the bubble caps for use in a floating raft of caps must be made of relatively light or thin material so that the cap can be made to float upon the surface of the liquid flowing across the tray. When caps are made of steel which is, of course, relatively heavy, the steel should be quite thin, as for example, from $\frac{1}{32}$ to $\frac{1}{16}$ of an inch. Since a cap of greater diameter has a larger volume, such a cap may be constructed of a heavier or thicker material. And conversely, if the caps are to be constructed of relatively small diameter, the caps will need to be made of light weight or very thin material. The following tabulation gives the volume in cubic inches required to float a ten ounce bubble cap on liquid propane, butane, and pentane:

TABLE I

*Displacement required to float 10 oz. bubble cap in various hydrocarbon systems*

|  | Propane $C_3$ | Butane $C_4$ | Pentane $C_5$ |
| --- | --- | --- | --- |
| Temperature, °F | 125 | 125 | 125 |
| Vapor Pressure, p. s. i | 254 | 105 | 17 |
| Density of Liquid, lb./cu. ft | 28.0 | 32.3 | 36.6 |
| Density of Vapor, lb./cu. ft. at above Vapor Pressure | 2.3 | 1.2 | .4 |
| Difference in Densities | 25.7 | 31.1 | 36.2 |
| Displacement Required to Support Bubble Caps of Conventional Shape, cu. in.: |  |  |  |
| Carbon Steel Caps | 42 | 35 | 30 |
| Aluminum Caps | 14.6 | 12.0 | 10.5 |

Approximate volume of conventional 10 oz. cap, above top of slot, is 18 cu. in.

In Table II are given the displacement volumes required to float bubble caps of 4, 5, 6, and 8 inches in diameter and made of carbon steel of $\frac{1}{16}$ inch and $\frac{1}{32}$ inch in thickness.

TABLE II

*Displacement required to float hemispherical bubble caps of various sizes in a propane system*

| Diameter of Cap, Inches | 4 | 5 | 6 | 8 |
| --- | --- | --- | --- | --- |
| Volume, $2.09\, r^3$, Cu. in | 16.7 | 26.1 | 56.5 | 134 |
| Surface, $6.28\, r^2$, Sq. in | 25.1 | 39.2 | 56.5 | 100 |
| Weight of Bubble Cap, Lbs.: |  |  |  |  |
| $\frac{1}{16}''$ Thick, .0176 lb./sq. in | .443 | .69 | 1.00 | 1.76 |
| $\frac{1}{32}''$ Thick, .0088 lb./sq. in | .222 | .35 | .50 | .88 |
| Effective Density of Propane @ 125° F. and 254 p. s. i. dl−dv, lb./cu. ft | 25.6 | 25.6 | 25.6 | 25.6 |
| Displacement Required to Float Bubble Cap, cu. in.: |  |  |  |  |
| $\frac{1}{16}''$ Thick | 30 | 47 | 67.5 | 119 |
| $\frac{1}{32}''$ Thick | 15 | 24 | 31.3 | 59 |

It should be noted that only 15 cubic inches displacement are required to float a 4″ diameter cap made of $\frac{1}{32}''$ carbon steel while 119 cu. in. displacement are required to float an 8″ diameter cap made of $\frac{1}{16}''$ steel. Other materials than steel and aluminum may be used for the construction of the bubble caps of this invention such as, for example, magnesium or plastic, or any other material which will, of course, resist corrosion or solution by the material being treated. The chimneys and trays and plates 13 and 16 and the like may be constructed of conventional materials. As will be realized by those skilled in the art, many variations and modifications of my invention may be made and yet remain within the spirit and scope of my invention.

Having described my invention, I claim:

1. In a column for contacting liquid with a vapor, a bubble cap tray assembly comprising a horizontally disposed tray having a plurality of chimneys disposed integral with said tray, a plurality of floatable bubble caps, each bubble cap comprising a gas-tight dome and having a lower slotted section rigidly attached thereto, said bubble caps rigidly attached to one another and at a spaced distance from each other in such a pattern that each cap of said plurality of caps is disposed over one chimney of said plurality of chimneys, at least three chimneys of said plurality of chimneys having an exterior ring fixed to the upper ends thereof, three caps of said plurality of caps defining the corners of a triangle, and at least three bubble caps of said plurality of caps having prong means rigidly attached to the under side thereof and surrounding said chimneys to which are affixed said rings in such a manner that said plurality of bubble caps may be raised vertically until said prong means contacts the under side of said exterior rings of said three chimneys.

2. In a column for contacting liquid with a vapor, a bubble cap tray assembly comprising a horizontally disposed tray, a plurality of chimneys of equal height disposed therein and a plurality of floatable bubble caps, each bubble cap comprising a gas-tight dome and having a lower slotted section rigidly attached thereto, a bubble cap of said plurality of bubble caps disposed over one each of said plurality of chimneys, some bubble caps of said plurality of caps rigidly attached to one another to form separate and rigid groups of caps, the caps of each group held rigidly affixed to one another by rods and bars and each cap of each group of caps is so positioned with respect to the remaining caps of its group as to rest directly over a chimney of said plurality of chimneys, three caps of each group of caps defining the corners of a triangle, an exterior flange attached to the upper end of at least two chimneys under each group of caps, at least two caps of each group of caps corresponding to said at least two flanged chimneys contain an assembly of guide members so disposed around the corresponding chimneys that the caps can move vertically upward to a point at which said guide members touch said flanges.

3. In a column for contacting liquid with a vapor, a bubble cap tray assembly comprising a horizontally disposed tray having a plurality of chimneys disposed integral with said tray, a plurality of floatable bubble caps, each bubble cap comprising a gas-tight dome and having a lower slotted section rigidly attached thereto, said bubble caps rigidly attached to one another and at a spaced distance from each other in such a pattern that each cap of said plurality of caps is disposed over one chimney of said plurality of chimneys, three caps of said plurality of caps defining the corners of a triangle, at least two chimneys of said plurality of chimneys having an exterior ring fixed to the upper ends thereof and at least two bubble caps of said plurality of caps having prong means rigidly attached to the under side thereof and surrounding said chimneys to which are affixed said rings in such a manner that said plurality of bubble caps may be raised vertically until said prong means contacts the under side of said exterior rings of said two chimneys.

HURSHEL VICTOR HENDRIX.

REFERENCES CITED

The following references are of record in the file of this patent:

UNITED STATES PATENTS

| Number | Name | Date |
|---|---|---|
| 1,711,656 | Risdon | May 7, 1929 |
| 1,808,276 | Widdell | June 2, 1931 |
| 1,811,247 | Smith | June 23, 1931 |
| 2,218,993 | Rupp et al. | Oct. 22, 1940 |
| 2,320,073 | Gibb | May 25, 1943 |
| 2,428,889 | Nutter | Oct. 14, 1947 |